United States Patent
Penth et al.

(10) Patent No.: US 6,299,668 B1
(45) Date of Patent: Oct. 9, 2001

(54) METHOD FOR SEPARATING MIXTURES OF SUBSTANCES USING A MATERIAL PERVIOUS TO SAID SUBSTANCES

(75) Inventors: Bernd Penth, Lebach; Gerhard Hoerpel, Nottuln; Christian Hying, Rhede, all of (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 0 days.

(21) Appl. No.: 09/308,230
(22) PCT Filed: Sep. 18, 1998
(86) PCT No.: PCT/EP98/05937
§ 371 Date: Jul. 26, 1999
§ 102(e) Date: Jul. 26, 1999
(87) PCT Pub. No.: WO99/15260
PCT Pub. Date: Apr. 1, 1999

(30) Foreign Application Priority Data

| Sep. 20, 1997 | (DE) | 197 41 498 |
| Mar. 18, 1998 | (DE) | 198 11 708 |
| Mar. 19, 1998 | (DE) | 198 12 035 |
| May 8, 1998 | (DE) | 198 20 580 |
| Jun. 3, 1998 | (DE) | 198 24 666 |

(51) Int. Cl.$^7$ ................................................. B01D 53/22
(52) U.S. Cl. ................ 95/45; 55/282.3; 55/DIG. 10; 95/74; 95/278; 95/283; 204/157.3
(58) Field of Search ................ 55/282.2, 282.3, 55/DIG. 10; 95/283, 278, 45, 54–56, 74; 210/500.25; 96/4, 11–13; 134/1, 10, 105; 204/228.7, 157.3

(56) References Cited

U.S. PATENT DOCUMENTS

| 4,946,592 | * | 8/1990 | Galaj et al. ................. 210/500.25 X |
| 5,059,366 | * | 10/1991 | Galaj et al. ................. 210/500.25 X |
| 5,100,632 | * | 3/1992 | Dettling et al. .................... 95/278 X |
| 5,207,807 | * | 5/1993 | Manfre et al. ................... 55/282.2 X |
| 5,376,442 | * | 12/1994 | Davidson et al. ........... 210/500.25 X |
| 5,405,422 | * | 4/1995 | Ueda et al. ...................... 55/DIG. 10 |
| 5,453,116 | * | 9/1995 | Fischer et al. .......................... 95/278 |
| 5,560,757 | * | 10/1996 | Suzuki et al. .................... 55/DIG. 10 |
| 5,571,298 | * | 11/1996 | Buck .................................... 55/282.3 |
| 5,611,832 | * | 3/1997 | Suzuki et al. .................... 55/DIG. 10 |
| 5,655,212 | * | 8/1997 | Sekhar et al. ................... 55/282.2 X |
| 5,885,657 | | 3/1999 | Penth ................................ 427/372.2 |

FOREIGN PATENT DOCUMENTS

| 195 06 843 | | 8/1996 | (DE) . |
| 195 45 042 | | 6/1997 | (DE) . |
| 0 165 744 | | 12/1985 | (EP) . |
| 0 380 266 | | 8/1990 | (EP) . |
| 474365 | * | 3/1992 | (EP) . |
| 0 686 420 | | 12/1995 | (EP) . |
| 60-193517 | * | 10/1985 | (JP) ......................................... 95/283 |
| 96/00198 | * | 1/1996 | (WO) . |
| 96/10453 | * | 4/1996 | (WO) . |

OTHER PUBLICATIONS

Cited In International Search Report Of Applicants' PCT Case PCT/EP98/05937.*

Europe 474365 was Cited In Applicants PCT Case WIPO 96/00198 is Equivalent of vs 5,885,657 Submitted By Applicants.*

* cited by examiner

*Primary Examiner*—Richard L. Chiesa
(74) *Attorney, Agent, or Firm*—Oblon, Spivak, McClelland, Maier & Neustadt, P.C.

(57) ABSTRACT

Mixtures of gases, liquids or solutions are separated by contacting the mixtures with a substance-permeable material and applying a voltage to the substance-permeable material, thereby increasing the efficiency of separation techniques such as microfiltration or ultrafiltration.

61 Claims, No Drawings

METHOD FOR SEPARATING MIXTURES OF SUBSTANCES USING A MATERIAL PERVIOUS TO SAID SUBSTANCES

This application is a national stage application of the International Application No. PCT/EP98/05937, filed Sep. 18, 1998.

A method is claimed of separating mixtures of substances by means of a substance-permeable material.

The separation of mixtures of substances is a problem which occurs often in the production of a variety of substances. In a particularly high frequency of cases, liquid phases containing solids are obtained. These solids, present partly as very small particles in the liquid phases, must frequently be removed from the liquids before the latter can be processed further. A separation task of this kind is encountered, for instance, in the beverage industry, where juices are to be separated from ultrafine solid components or where wastewaters require cleaning. Similarly, it may be the case that mixtures of two liquids of different molecular size need to be separated from one another. If this is not possible by distillation because, for example, an azeotrope is formed, the separation can be undertaken, for example, by means of pervaporation.

Membranes have long been used to ;separate mixtures of substances. In the case of synthetic membranes, a distinction is made between organic and inorganic membranes.

It is common to use membranes made of polymers or of inorganic components, such as oxides, for example. With the known methods in which these membranes are employed, such as electrolyses or filtrations, for example, there is always the problem that the membranes become blocked after a relatively short period of use, and the passage of substance through the membrane is considerably reduced. The membranes have to be changed and either laboriously cleaned or disposed of.

In the case of sufficiently stable ceramic membranes, the backwash principle has become established. At periodic intervals of time, the direction of flow is suddenly reversed for a short time by applying a pressure surge from the back side. This principle, however, has the disadvantages that it can be used effectively only in the case of liquid filtration, that, moreover, it subjects the membranes to high mechanical stress, and, finally, that, it is capable of removing only some of the caked-on material.

EP 0 165 744, EP 0 380 266 and EP 0 686 420 claim processes which, in order to clean a filter, cause gas bubbles to be formed by application of a voltage and performance of an electrolysis on the filter. The gas bubbles clean the filter surface, and so longer filter service times are achieved.

However, the abovementioned processes are unable to clean the inside of a filter. There is therefore a considerable reduction in the passage of substance through the filter in the course of filtration.

It is an object of the present invention to provide a method of separating mixtures of substances by means of a substance-permeable material which improves separation and makes it more economic by improving the passage of substance through the material.

It has surprisingly been found that the separation can be performed significantly better and more economically with a method of separating mixtures of substances by means of a substance-permeable material by applying to said material an electrical voltage for at least a short time.

The present invention therefore provides a method of separating mixtures of substances by means of a substance-permeable material, which comprises applying to said material an electrical voltage for at least a short time.

The method of the invention has the advantage that by applying a voltage to the material the latter can be heated. When the material is used as a membrane, separation is significantly accelerated by the higher temperature in the membrane. The heating of the material also makes it possible to achieve the thermal destruction of substances having become deposited in or on the material in the course of the separation process. This may take place either during separation or in a cleaning cycle.

A further advantage of the method of the invention is that by applying a voltage to a substance-permeable material it is possible to remove substances from and out of the material used as membrane by virtue of the fact that, on and in the membrane, gas bubbles are formed which loosen any blockage of the membrane.

The method of the invention has the advantage, in addition, that by applying a voltage to the material the latter becomes electrically charged. As a result, charged particles present in the mixture of substances to be separated and having the same charge as the material are kept away from the material; as a result, depending on the pore size of the membrane material, it is also possible to retain salts in the course of the separation.

The method of the invention is described by way of example below, without the method being restricted to the exemplary description.

In accordance with the invention, the novel method of separating mixtures of substances by means of a substance-permeable material applies to said material an electrical voltage for at least a short time.

The substance-permeable material employed can be a substance-permeable composite material.

By substance-permeable composite materials or supports are meant materials which are permeable to substances having a particle size of from 0.5 nm to 500 $\mu$m, depending on the configuration of the composite material or support. The substances can be gaseous, liquid or solid, or can be present in a mixed form of these aggregate states.

Said substance-permeable composite material has as its basis preferably at least one perforate and substance-permeable support. On at least one surface of the support and in its interior, the support has at least one inorganic component which essentially comprises at least one compound of a metal, a semimetal or a mixed metal with at least one element from main groups 3 to 7.

The substance-permeable composite material can be obtained by applying a suspension which comprises at least one inorganic component comprising a compound of at least one metal, semimetal or mixed metal with at least one element from main groups 3 to 7, and a sol, to a perforate and substance-permeable support and by subsequent heating at least once, in the course of which the suspension comprising at least one inorganic component is solidified on or in, or on and in, the support.

In accordance with the invention the composite material can be permeable to gases, solids or liquids, especially to particles having a size of from 0.5 nm to 10 $\mu$m.

As the perforate and substance-permeable support it is possible to use supports having interstices with a size of from 0.002 to 500 $\mu$m, preferably from 100 to 500 $\mu$m. The supports used are at least partly electrically conducting.

The interstices can be pores, meshes, holes, crystal lattice interstices or cavities. The support can comprise at least one material selected from carbon, metals, alloys, glass, ceramics, minerals, polymers, amorphous substances, natural products, composites, or from at least one combination of these materials. The supports which can comprise the abovementioned materials may have been modified by a chemical, thermal or mechanical method of treatment or a combination of these methods of treatment. The composite material preferably comprises a support, comprising at least one metal, natural fiber or polymer, which has been modified by at least one mechanical deformation technique or method of treatment, such as, for example, drawing, compressing, flexing, rolling, stretching or forging. Very preferably the composite material comprises at least one support which comprises at least woven, bonded, felted or ceramically bound fibers or at least sintered or bonded shaped articles, beads or particles. In a further preferred embodiment, a perforated support can be used. Substance-permeable supports can also be those which acquire their permeability or have been made permeable by laser treatment or ion beam treatment.

It can be advantageous for the support to comprise fibers of at least one material selected from carbon, metals, alloys, ceramics, glass, minerals, polymers, amorphous substances, composites and natural products or fibers of at least One combination of these materials, such as, for example, asbestos, glass fibers, rockwool fibers, carbon fibers, metal wires, steel wires, polyamide fibers, coconut fibers, and coated fibers. It is preferred to use supports which comprise at least woven fibers of metal or alloys.

Wires can also be used as metal fibers. Very preferably, the composite material comprises a support which comprises at least one woven fabric made of steel or stainless steel, such as, for example, woven fabrics produced from steel wires, steel fibers, stainless steel wires or stainless steel fibers by weaving and having a mesh size of preferably from 5 to 500 $\mu$m, with particular preference from 50 to 500 $\mu$m and, with very particular preference, from 70 to 120 $\mu$m.

Alternatively, the support of the composite material can comprise at least one expanded metal having a pore size of from 5 to 500 $\mu$m. In accordance with the invention, however, the support can also comprise at least one particulate, sintered metal, a sintered glass or a metal nonwoven with a pore size of from 0.1 $\mu$m to 500 $\mu$m, preferably from 3 to 60 $\mu$m.

The composite material preferably features a support comprising at least aluminum, silicon, cobalt, manganese, zinc, vanadium, molybdenum, indium, lead, bismuth, silver, gold, nickel, copper, iron, titanium, platinum, stainless steel, steel, brass, an alloy of these materials, or a material coated with Au, Ag, Pb, Ti, Ni, Cr, Pt, Pd, Rh, Ru and/or Ti.

The inorganic component present in the composite material can comprise at least one compound of at least one metal, semimetal or mixed metal with at least one element of main groups 3 to 7 of the Periodic Table or at least one mixture of these compounds. In this context, the compounds of the metals, semimetals or mixed metals can comprise at least elements of the subgroup elements and of main groups 3 to 5 or at least elements of the subgroup elements or of main groups 3 to 5, said compounds having a particle size of from 0.001 to 25 $\mu$m. The inorganic component preferably comprises at least one compound of an element from subgroups 3 to 8 or at least one element from main groups 3 to 5 with at least one of the elements Te, Se, S, O, Sb, As, P, N, Ge, Si, C, Ga, Al or B or at least one compound of an element of subgroups 3 to 8 and at least one element of main groups 3 to 5 with at least one of the elements Te, Se, S, O, Sb, As, P, N, Ge, Si, C, Ga, Al or B, or a mixture of these compounds. With particular preference, the inorganic component comprises at least one compound of at least one of the elements Sc, Y, Ti, Zr, V, Nb, Cr, Mo, W, Mn, Fe, Co, B, Al, Ga, In, Tl, Si, Ge, Sn, Pb, Sb or Bi with at least one of the elements Te, Se, S, O, Sb, As, P, N, C, Si, Ge or Ga, such as, for example, $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium aluminum garnet or of one of these elements itself. The inorganic component mar also comprise aluimosilicates, aluminum phosphates, zeolites, including partially exchanged zeolites, such as, for example, ZSM-5, Na-ZSM-5 or Fe-ZSM-5 or amorphous microporous mixed oxides which can include up to 20% of nonhydrolyzable organic compounds, such as, for example, vanadium oxide-silicon oxide glass or aluminum oxide-silicon oxide-methylsilicon sesquioxide glasses.

Preferably, at least one inorganic component lies within a particle size fraction having a particle size of from 1 to 250 nm or having a particle site of from 260 to 10,000 nm.

It can be advantageous for the composite material to comprise at least two particle size fractions of at least one inorganic component The particle size ratio of the particle size fractions in the composite material is from 1:1 to 1:10,000, preferable from 1:1 to 1:100. The quantitative ratio of the particle size fractions in the composite material can be preferably from 0.01:1 to 1:0.01.

The permeability of the composite material of the invention can be limited to particles having a defined maximum size by way of the particle size of the inorganic component used.

The suspension comprising at least one inorganic component, by means of which the composite material can be obtained, can comprise at least one liquid selected from water, alcohol and acid or a combination of these liquids.

The composite material may comprise at least one catalytically active component. The catalytically active component can be identical with the inorganic component. This is the case in particular when the inorganic component has catalytically active centers on the surface.

The catalytically active component of the composite material comprises preferably at least one inorganic material, at least one metal or at least one organometallic compound on whose surface catalytically active centers are located. With particular preference, the catalytic component of the composite material comprises a zeolite, such as, for example, ZSM-5, Fe-ZSM-5, silicalite or an amorphous microporous mixed oxide as described, for example, in DE 195 45 042 and/or DE 195 06 843, such as, for example, vanadium oxide-silicon oxide glass or aluminum oxide-silicon oxide-methylsilicon sesquioxide glasses.

The composite material may also, however, comprise as catalytically active component at least one oxide of at least one of the elements Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr and Ba.

In one particular embodiment of the catalytically active, substance-permeable composite material of the invention, it comprises as catalytically active component at least titanium suboxide.

It may likewise be advantageous for the composite material to comprise as catalytically active component at least one metal compound selected from the compounds of the metals Pt, Rh, Ru, Ir, Au, Ag, Os, Re, Cu, Ni, Pd and Co, or at least one metal selected from the metals Pt, Rh, Ru, Ir, Au, Ag, Os, Re, Cu, Ni, Pd and Co.

In one particularly preferred embodiment of the composite material, said material can be constructed so as to be flexible, without destroying the inorganic component solidified inside and on the support. Preferably, the composite material is flexible to a small radius of up to 1 mm.

The application of an electrical voltage for at least a short time, in accordance with the invention, is preferably accomplished by applying the voltage to the support of the material. The applied voltage can comprise direct current or alternating current or a direct current upon which an alternating current is superimposed. The voltage can be applied not only for a short time but also over a relatively long period or throughout the entire duration of the separation process. The voltage can be applied such that only one pole of a current source is connected to the material or to the support present in said material, or such that both poles of a current source are connected to the material or to the support present in said material. The voltage can be applied periodically, discontinuously or continuously.

The material can be used as membrane. This membrane can be used both in separation processes based on the principle of electrolysis or electrodialysis, or in separation processes based on the principle of gas filtration, nanofiltration, ultrafiltration micro-filtration or pervaporation.

It can be advantageous for the material and/or the membrane to be negatively or positively charged. This can take place, for example, by the material and/or membrane being connected as cathode or anode.

By connecting the material as the anode or cathode, the inorganic component in the material can be converted into an electrically conducting component, so that the material or—if the material is employed as a membrane—the membrane becomes a good electrical conductor. To produce electrically conducting materials and membranes, use is preferably made of those comprising at least titanium oxide as inorganic component in the material.

It may further be advantageous to generate positive or negative charges on the surface and in the interior of the material by applying an electrical field or an electrical voltage.

In accordance with the invention, the material can be cleansed of impurities having deposited on and in the material during the separation process, by applying to said material a voltage for at least a short time. In the case of certain methods, moreover, it is possible to prevent substances depositing on or in the material or membrane if the substances have a charge of the same type as the material or membrane. The material or membrane can be cleaned during the separation process or in a cleaning cycle. By means of the cleaning it is possible to remove deposits or blockages from the material or membrane. The removal and/or prevention of deposits and contaminants prolongs the passage of substance and/or the activity of the material or membrane. The service lives of such substance-permeable materials can be prolonged considerably by this means.

Cleaning can take place, for example, by the material accepting a positive or negative charge and repelling contaminants which have a like charge.

It can be advantageous to employ the material as a membrane electrode. By this means the material can be cleansed of contaminants having deposited on and in, or on or in, the material during the separation process by means of gas bubbles which are formed by briefly applying to said material an electrical voltage which breaks down a substance on and/or in the material. For this purpose, the material in aqueous systems is connected as the cathode and, when a voltage is applied to the material, gas bubbles predominantly comprising hydrogen are formed in and/or on the material. In aqueous systems, gas bubbles predominantly comprising oxygen are formed on and/or in the material connected as the cathode. In organic systems, gas bubbles of, for example, carbon dioxide or nitrogen are formed on the material connected as electrodes. In this way it is possible, for example, to avoid the occurrence of fouling (layers) on or in membranes. As the counterelectrode it is possible to use conventional electrodes. Alternatively, it can be advantageous to use the material as a membrane counterelectrode. This can be advantageous when, for example, filtration is carried out using not just one membrane or filter but instead at least two filters. These filters may consist of materials having the same or a different pore size. If one filter is connected as the anode and the second as the cathode, then it is possible to clean both filters at the same time by briefly applying a voltage. Where more than two filters are used, the filters can be connected in turn as cathode or anode. If cleaning would result in the formation of explosive mixtures, such as hydrogen and oxygen, for example, it can be advantageous to arrange the membrane electrodes such that the gases formed can he led off separately from one another.

This special embodiment of the method of tile invention, described above, can be employed with all media requiring filtration that are electrically conducting and/or can be broken down into gaseous components by electrolysis. The method of the invention can likewise be used when the filtrate comprises at least one component that can be converted to gaseous components by electrolysis.

It can be advantageous for the material to be heated by application of an electrical voltage. This heating can take place during the separation process. If the material is employed as a membrane, the heating of the material increases the mobility in the membrane of the particles which are intended to pass through the membrane. By means of an electrically heated material employed in this way it is possible to increase considerably the separation performance or the amount which passes through.

Alternatively, the material can be heated at regular intervals inside or outside the separation process. Since the material—depending on its composition also Withstands high temperatures, it is possible in this way to cleanse the material employed as membrane from impurities having deposited on and in, or on or in, the material during the separation process. In this case it is possible to subject organic or inorganic compounds which block the membrane material to thermal destruction or removal by sublimation or liquefication.

It can be useful to remove a material or membrane from the separation process and to clean the material or membrane by applying a voltage or by causing heat to act on deposits or impurities. This can be done in air, in a suitable cleaning composition, or in an electrolyte.

The method of the invention can be used for electromicrofiltration, electroultrafiltration, or electronanofiltration.

Likewise, the method of the invention can be used for hydrogen generation with simultaneous catalytic reduction or for oxygen generation with simultaneous catalytic oxidation.

The method of the invention is particularly suitable for separating substances having different isoelectric points.

It can be advantageous to combine preferred embodiments of the method of the invention with at least one further preferred embodiment of the method of the invention. Similarly, it can be advantageous to combine preferred embodiments of the composite material with at least one further particular embodiment or form of the composite material. In awareness of the present invention, further embodiments of the method of the invention and/or further possible uses for the method of the invention will be revealed to the skilled The method is described in though not limited to the following examples.

EXAMPLE 1.1

A suspension of 30 g of titanium tetraisopropoxide was hydrolyzed with 60 g of water and then peptized with 45 g of sulfuric acid (20%). Subsequently, 90 g of aluminum oxide (Al6SG, Alcoa) were added and the mixture was stirred until the agglomerates were completely disrupted. This suspension was applied to an expanded metal having an average mesh size of 50 μm and dried and solidified at 450° C. within 2 seconds.

The composite material produced in this way was employed as an electrode membrane in an electrolysis. When an electrical voltage of about 2.5 volts was applied to the electrode membrane in a solution of a noble metal, there was electrolytic deposition of the noble metal in the pores of the composite material. This is only possible owing to the use of titanium dioxide as an inorganic component in the composite material, since owing to the formation of titanium suboxide the latter becomes electrically conducting at a voltage of more than 2 volts. Graphite electrodes were used as counterelectrode. By this means it is possible to deposit virtually all known noble metal catalysts and noble metal catalyst systems (such as Pt/Rh, Pt/Pd or Pt/Ir, for example).

EXAMPLE 1.2

A suspension of 30 g of titanium tetraisopropoxide was hydrolyzed with 60 g of water and then peptized with 45 g of nitric acid (25%). Subsequently, 30 g of titanium dioxide (P25, Degussa) were added and the mixture was stirred until the agglomerates were completely disrupted. This suspension was applied to a titanium wire mesh having an average mesh size of 80 μm, and dried and solidified at 450° C. within 2 seconds. If the composite material produced in this way and connected as a cathode, with a graphite anode, is immersed in a 17 solution of ammonium nitrate in water, the nitrate is broken down almost completely at a voltage of 2.1 volts and a current yield of 20% within 10 hours.

The method of the invention is therefore suitable for reducing nitrate compounds, especially for nitrate breakdown in aqueous systems.

EXAMPLE 1.3

A suspension of 30 g of titanium tetraisopropoxide was hydrolyzed with 60 g of water and then peptized with 45 g of nitric acid (25%). Subsequently, 70 g of aluminum oxide of the type CT3000SF from Alcoa were added and the mixture was stirred until the agglomerates were completely disrupted. This suspension was applied to a titanium wire mesh having an average mesh size of 80 μm. and dried and solidified at 450° C. within 5 seconds. If the composite material produced in this way is used as a cathode, connected with a graphite anode in a flat module, a 10% latex dispersion of particle size 260 nm can be subjected to clarifying filtration in the crossflow technique with an applied voltage of 2.5 V without the occurrence of deposits of the latex on the membrane surface being observed.

If the same experiment is repeated without applying a voltage, the membrane is coated with a latex film after a filtration time of 1 h.

What is claimed is:

1. A method of separating a mixture of substances, comprising:
    contacting said mixture of substances with a substance-permeable material; and
    applying an electrical voltage to said substance-permeable material, thereby heating and cleaning the inside and the surface of said substance-permeable material;
    wherein said substance-permeable material is permeable to a particle having a size of from 0.5 nm to 500 μm.

2. The method as claimed in claim 1, wherein said electrical voltage is applied for 10 hours.

3. The method as claimed in claim 1, wherein said electrical voltage is between 2.1 and 2.5 volts.

4. The method as claimed in claim 1, wherein said substance-permeable material is a composite material based on at least one perforated and substance-permeable support; and
    wherein on at least one side and an interior of said perforated and substance-permeable support there is at least one inorganic component selected from the group consisting of a metal, a semimetal and a mixed metal with at least one element from Groups 3 to 7 of the Periodic Table of Elements.

5. The method as claimed in claim 4, wherein said composite material is permeable to a gas, a solid or a liquid.

6. The method as claimed in claim 4, wherein said composite material is permeable to a particle having a size of from 0.5 nm to 10 μm.

7. The method as claimed in claim 4, wherein the perforated and substance-permeable support has an interstice with a size of from 0.02 to 500 μm.

8. The method as claimed in claim 4, wherein the perforated and substance-permeable support is a material selected from carbon, a metal, an alloy, a ceramic, a glass, a mineral, a polymer, an amorphous substance, a natural product, a composite or a combination thereof.

9. The method as claimed in claim 4, wherein the perforated and substance-permeable support has been modified by a method selected from the group consisting of a thermal, a mechanical treatment and a chemical treatment or a combination thereof.

10. The method as claimed in claim 4, wherein the perforated and substance-permeable support comprises a metal, a natural fiber or a polymer; and
    wherein said perforated and substance-permeable support has been modified by a mechanical deformation technique selected from the group consisting of drawing, compressing, rolling, stretching and forging.

11. The method as claimed in claim 4, wherein the perforated and substance-permeable support comprises a material selected from the group consisting of a woven fiber, a felted fiber, a ceramically bound fiber, a sintered bead and a particle.

12. The method as claimed in claim 4, wherein the support is perforated.

13. The method as claimed in claim 4, wherein the perforated and substance-permeable support has been made permeable by laser treatment or ion beam treatment.

14. The method as claimed in claim 4, wherein the perforated and substance-permeable support comprises fibers of at least one material selected from the group consisting of carbon, a metal, an alloy, a ceramic, a glass, a mineral, a polymer, an amorphous substance, a composite, a natural product and a combination thereof.

15. The method as claimed in claim 4, wherein the perforated and substance-permeable support comprises a woven fiber of a metal or an alloy.

16. The method as claimed in claim 4, wherein the perforated and substance-permeable support comprises at least one woven fabric made of steel.

17. The method as claimed in claim 4, wherein the perforated and substance-permeable support comprises at least one woven fabric or an expanded metal having a mesh size of from 5 to 500 µm.

18. The method as claimed in claim 4, wherein the support is at least partly electrically conducting.

19. The method as claimed in claim 4, wherein the support comprises a sintered metal, a sintered glass or a non-woven metal having a pore size of from 0.1 to 500 µm.

20. The method as claimed in claim 4, wherein the support comprises a material coated with Au, Ag, Pb, Ti, Ni, Cr, Pt, Pd, Rh, Ru, Ti, a combination of Ru and Ti; or
wherein the support comprises a material selected from the group consisting of aluminum, silicon, cobalt, manganese, zinc, vanadium, molybdenum, indium, lead, bismuth, silver, gold nickel, copper, iron, titanium, platinum, stainless steel, steel, and brass; or
wherein the support comprises an alloy of at least two materials selected from the group consisting of aluminum, silicon, cobalt, manganese, zinc, vanadium, molybdenum, indium, lead, bismuth, silver, gold nickel, copper, iron, titanium, platinum, stainless steel, steel, and brass.

21. The method as claimed in claim 4, wherein said inorganic component comprises at least one compound of an element of the subgroups, a compound of an element of main groups 3 to 5 of the Periodic Table of Elements or a combination thereof having a particle size of from 0.01 to 25 µm.

22. The method as claimed in claim 4, wherein the inorganic component comprises a compound of an element of the subgroups 3 to 8 or of an element of the main groups 3 to 5 of the Periodic Table of Elements or a combination thereof with at least one of the elements Te, Se, S, O, Sb, As, P, N, Ge, Si, C, Ga, Al or B.

23. The method as claimed in claim 4, wherein the inorganic component comprises at least one compound of at least one of the elements Sc, Y, Ti, Zr, V, Cr, Mo, W, Mn, Fe, Co, B, Al, In, Tl, Si, Gie, Sn, Pb, Sb or Bi with at least one of the elements Te, Se, S, O, Sb, As, P, N, C or Ga; or
at least one of the elements Sc, Y, Ti, Zr, V, Cr, Mo, W, Mn, Fe, Co, B, Al, In, Tl, Si, Ge, Sn, Pb, Sb, Bi, Te, Se, S, O, Sb, As, P, N, C or Ga.

24. The method as claimed in claim 4, wherein the inorganic component comprises an alumosilicate, an aluminum phosphate, a zeolite or a partially modified zeolite.

25. The method as claimed in claim 4, wherein the inorganic component comprises amorphous microporous mixed oxides which can include up to 20% of an non-hydrolyzable organic compound.

26. The method as claimed in claim 4, wherein the composite material comprises at least two particle size fractions of at least one inorganic component.

27. The method as claimed in claim 26, wherein said particle size fractions have a particle size ratio of from 1:1 to, 1:100.

28. The method as claimed in claim 26, wherein the composite material has a quantitative ratio of said particle size fractions of from 0.01:1 to 1:0.01.

29. The method as claimed in claim 4, wherein a permeability of the composite material is limited to a particle having a defined maximum size based on the particle size of said inorganic component.

30. The method as claimed in claim 4, wherein a suspension comprises at least one inorganic component and at least one liquid selected from the group consisting of water, alcohol, acid and a combination thereof.

31. The method as claimed in claim 4, wherein the composite material comprises as catalytically active component at least one inorganic material, at least one metal of at least one organometallic compound;
wherein a catalytically active center is located on a surface of said catalytically active component.

32. The method as claimed in claim 31, wherein the composite material comprises as catalytic component a zeolite, a silicalite or an amorphous microporous mixed oxide.

33. The method as claimed in claim 31, wherein the composite material comprises as catalytically active component at least one oxide of Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr or Ba.

34. The method as claimed in claim 31, wherein the composite material comprises as catalytically active component titanium suboxide.

35. The method as claimed in claim 31, wherein the composite material comprises as catalytically active component at least one metal selected from the group consisting of Pt, Rh, Ru, Ir, Au, Ag, Ce, Os, Re, Cu, Ni, Pd and Co.

36. The method as claimed in claim 31, wherein the composite material comprises as catalytically active component at least one metal selected from the group consisting of Pt, Rh, Ce, Ru, Ir, Au, Ag, Os, Re, Cu, Ni, Pd and Co.

37. The method as claimed in claim 4, wherein the composite material is electrically conducting.

38. The method as claimed in claim 4, wherein the composite material is flexible.

39. The method as claimed in claim 38, wherein the composite material is flexible to a very small radius of up to 1 mm.

40. The method as claimed in claim 1, wherein the substance-permeable material is a membrane.

41. The method as claimed in claim 1, wherein the substance-permeable material is negatively charged.

42. The method as claimed in claim 1, wherein the substance-permeable material is positively charged.

43. The method as claimed in claim 1, wherein the substance-permeable material is a cathode.

44. The method as claimed in claim 1, wherein the substance-permeable material is an anode.

45. The method as claimed in claim 43, wherein by connecting the substance-permeable material as an electrode the inorganic component in the material is converted into an electrically conducting component.

46. The method as claimed in claim 1, wherein a positive or a negative charge is generated on a surface of the substance-permeable material by applying an electrical field.

47. The method as claimed in claim 1, wherein the substance-permeable material is cleansed of a contaminant having deposited on and in the material during the separation process by applying to said substance-permeable material an electrical voltage.

48. The method as claimed in claim 1, wherein the substance-permeable material is employed as a membrane electrode.

49. The method as claimed in claim 1, wherein the substance-permeable material is cleansed by a gas bubble of an impurity having deposited on, in, or both, the material during said separating;
wherein said gas bubble is formed by briefly applying to said substance-permeable material an electrical voltage which breaks down a substance; and
wherein the material is connected as a cathode or an anode.

50. The method as claimed in claim 49, wherein, on or in or both, the material connected as cathode in an aqueous system, at least one gas bubble of hydrogen is formed.

51. The method as claimed in claim 49, wherein, on or in or both, the material connected as anode in an aqueous system, at least one gas bubble of oxygen is formed.

52. The method as claimed in claim 49, wherein in an organic system at least one gas bubble of carbon dioxide or nitrogen is formed on or in or both, the substance-permeable material connected as cathode or anode.

53. The method as claimed in claim 1, wherein the substance-permeable material is heated by applying an electrical current.

54. The method as claimed in claim 1, wherein the substance-permeable material is cleansed by heating of impurities having deposited on or in or both, the substance-permeable material during said separating.

55. The method as claimed in claim 1, wherein said substances have different isoelectric point.

56. A method for generating hydrogen, comprising:
   contacting a mixture of at least two substances with a substance-permeable material; and
   applying an electrical voltage to said substance-permeable material, thereby heating and cleaning the inside and the surface of said substance-permeable material and simultaneously generating hydrogen and reducing said mixture catalytically;
      wherein said substance-permeable material is permeable to a particle having a size of from 0.5 nm to 500 $\mu$m.

57. The method as claimed in claim 56, wherein said electrical voltage is applied for 10 hours.

58. The method as claimed in claim 56, wherein said electrical voltage is between 2.1 and 2.5 volts.

59. A method for generating oxygen, comprising:
   contacting a mixture of at least two substances with a substance-permeable material; and
   applying an electrical voltage to said substance-permeable material, thereby heating and cleaning the inside and the surface of said substance-permeable material and simultaneously generating oxygen and oxidizing said mixture catalytically;
      wherein said substance-permeable material is permeable to a particle having a size of from 0.5, nm to 500 $\mu$m.

60. The method as claimed in claim 59, wherein said electrical voltage is applied for 10 hours.

61. The method as claimed in claim 59, wherein said electrical voltage is between 2.1 and 2.5 volts.

* * * * *